United States Patent
Peters

(10) Patent No.: US 9,464,655 B2
(45) Date of Patent: Oct. 11, 2016

(54) PUSH-LOCK PIN

(71) Applicant: United Technologies Corporation, Hartford, CT (US)

(72) Inventor: Donald W. Peters, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 335 days.

(21) Appl. No.: 13/661,650

(22) Filed: Oct. 26, 2012

(65) Prior Publication Data

US 2014/0116057 A1 May 1, 2014

(51) Int. Cl.
| | |
|---|---|
| F23R 3/60 | (2006.01) |
| F16B 21/16 | (2006.01) |
| F23M 5/04 | (2006.01) |
| F23R 3/00 | (2006.01) |
| F16B 5/06 | (2006.01) |

(52) U.S. Cl.
CPC ............. F16B 21/165 (2013.01); F23M 5/04 (2013.01); F23R 3/007 (2013.01); F23R 3/60 (2013.01); F16B 5/065 (2013.01); F16B 5/0664 (2013.01); F23M 2900/05004 (2013.01); Y10T 403/592 (2015.01)

(58) Field of Classification Search
CPC .......... F23R 3/002; F23R 3/007; F23R 3/08; F23R 3/60; F02K 1/822; F16B 21/125; F16B 21/165; F16B 21/06; F16B 5/0642; B60R 13/0206

USPC ............... 60/752, 753, 757, 766, 796, 798; 403/322.2; 411/347, 348; 24/458, 607, 24/453

See application file for complete search history.

(56) References Cited

U.S. PATENT DOCUMENTS

| | | | | |
|---|---|---|---|---|
| 2,968,205 | A | * | 1/1961 | Springate ...................... 411/348 |
| 2,984,884 | A | * | 5/1961 | Chapman et al. ............. 411/555 |
| 5,592,814 | A | * | 1/1997 | Palusis et al. .................. 60/770 |
| 6,283,660 | B1 | | 9/2001 | Furlong et al. |
| 6,664,953 | B2 | | 12/2003 | Quek |
| 7,508,383 | B2 | | 3/2009 | Lev et al. |
| 2008/0003077 | A1 | * | 1/2008 | Anderson ...................... 411/347 |

FOREIGN PATENT DOCUMENTS

| | | |
|---|---|---|
| EP | 1221383 | 7/2002 |
| GB | 2322401 | 8/1998 |

* cited by examiner

Primary Examiner — Ehud Gartenberg
Assistant Examiner — Thomas Burke
(74) Attorney, Agent, or Firm — Carlson, Gaskey & Olds, P.C.

(57) ABSTRACT

A push-lock pin for connecting a plate to surface includes a cylindrical pin housing and a shaft within the housing. The shaft has a ball-lock mechanism and a push-down pop-up mechanism.

14 Claims, 7 Drawing Sheets

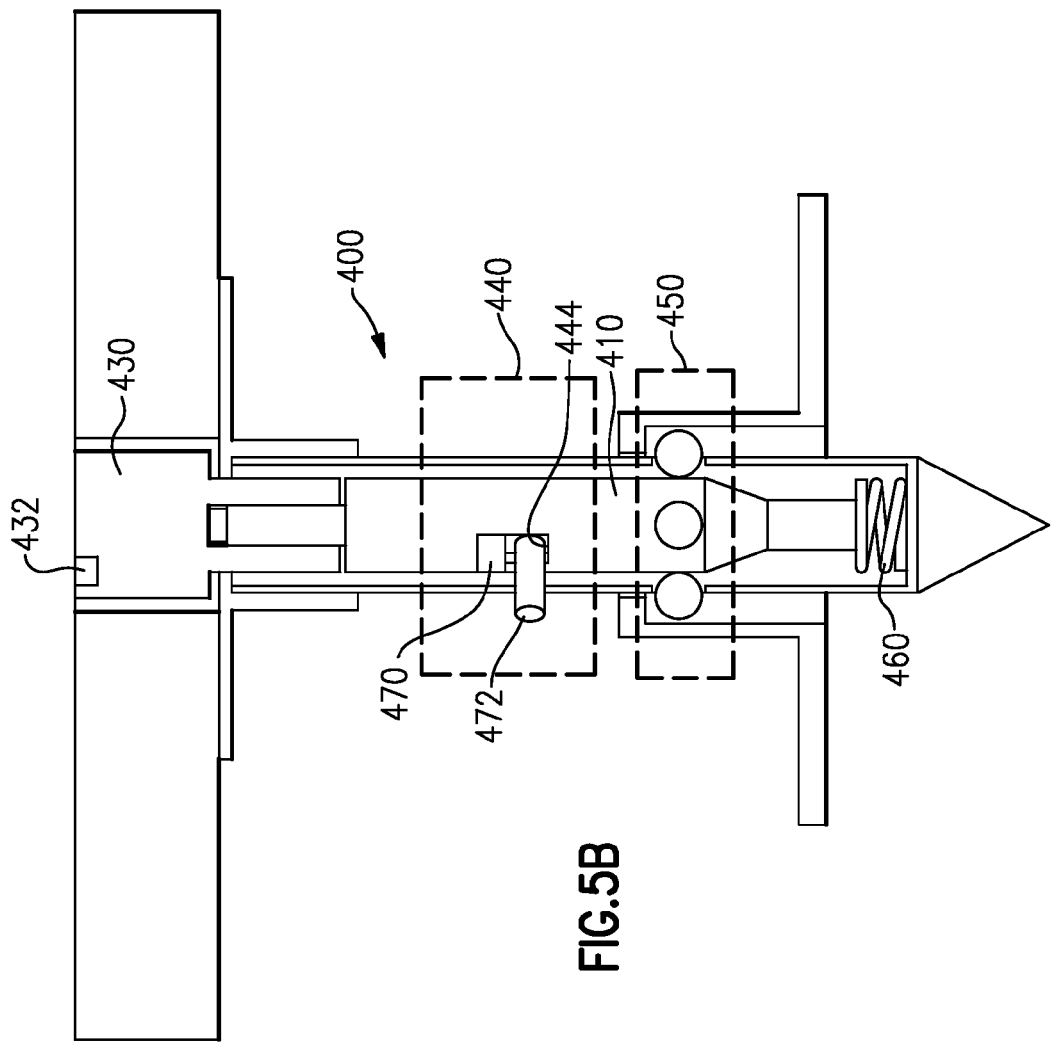

PUSH-LOCK PIN

TECHNICAL FIELD

The present disclosure is directed generally toward connector pins, and more particularly, toward a push-lock connector pin for an insulation panel.

BACKGROUND OF THE INVENTION

Aircraft engines, such as those used in commercial aircraft, incorporate heated gas flows as part of their standard operations. In order to protect portions of the engine from the excess heat generated by the heated gas flows, insulation tiles are installed in some areas of the gas flow path. Using current fastener designs, a technician installing or replacing the insulation tiles requires access to the backside of the engine substructure that the tile is attached to. In order to access the backside of the substructure, the engine is removed from the aircraft. Removing the engine to facilitate replacing or repairing an insulation tile significantly increases cost beyond the actual costs of replacing the tile itself.

SUMMARY OF THE INVENTION

According to an exemplary embodiment of this disclosure, among other possible things includes a push-lock pin for connecting a plate to a surface including, a cylindrical pin housing, a shaft within the cylindrical pin housing the shaft comprises a ball lock mechanism, and a push-down pop-up mechanism, a cap, connected to a first axial end of the shaft; and a spring connected to a second axial end of the shaft, the second axial end is opposite the first axial end.

In a further embodiment of the foregoing push-lock pin, the ball lock mechanism includes a ball lock section of the shaft and a locking feature, the ball-lock mechanism has a larger diameter than a remainder of the shaft, and the locking feature is adjacent said ball-lock section of the shaft when the shaft is in a locked position.

In a further embodiment of the foregoing push-lock pin, the locking feature protrudes from at least one opening in the pin housing when the push-lock pin is in a locked position.

In a further embodiment of the foregoing push-lock pin, the spring is at least partially compressed when the pin is in a locked position.

In a further embodiment of the foregoing push-lock pin, the locking feature is a plurality of approximately spherical bearings.

In a further embodiment of the foregoing push-lock pin, the push-down pop-up mechanism includes a separate pin component and a cam having a low equilibrium point and a high equilibrium point, the spring is maintained in a compressed state when the cam is at the high equilibrium point, and the spring is maintained in a partially relaxed state when the cam is at the low equilibrium point.

In a further embodiment of the foregoing push-lock pin, the ball lock mechanism is in a locked position when the separate pin component is in the high equilibrium point, and the ball lock mechanism is in an unlocked position when the separate pin component is in a low equilibrium point.

In a further embodiment of the foregoing push-lock pin, the push-down pop-up mechanism includes a combination of at least one shaft feature and at least one cap feature, the shaft feature includes a high equilibrium point and the shaft feature includes a low equilibrium point.

In a further embodiment of the foregoing push-lock pin, the at least one shaft feature is a groove in the shaft, and the push-down pop-up mechanism further includes a separate pin component interfacing with the groove.

In a further embodiment of the foregoing push-lock pin, the cap feature is a slot in the cap and the slot is operable to interface with a tool.

In a further embodiment of the foregoing push-lock pin, the shaft feature includes a plurality outcroppings on the shaft and the cap feature interfaces with the plurality of outcroppings.

In a further embodiment of the foregoing push-lock pin, further includes a self-rotation feature operable to cause the shaft to rotate when the cap is pressed.

According to an exemplary embodiment of this disclosure, among other possible things includes a turbine engine exhaust liner tile comprising, a ceramic tile surface, a push-lock pin hole in the ceramic tile surface, a connector connecting at least one push-lock pin to the ceramic tile surface and retaining the push-lock pin in the push-lock pin hole, at least one push-lock pin for connecting the ceramic tile surface to a turbine engine exhaust path wall, the push-lock pin comprises a cylindrical pin housing, and a shaft within the cylindrical pin housing the shaft comprises a ball lock mechanism, and a push-down pop-up mechanism, a cap connected to a first axial end of the shaft, and a spring connected to a second axial end of the shaft, the second axial end is axially opposite the first axial end.

In a further embodiment of the foregoing turbine engine exhaust liner tile, the cap is flush with a surface of the tile when the push-lock pin is in a locked position.

In a further embodiment of the foregoing turbine engine exhaust liner tile, the ceramic tile surface is a heat panel.

In a further embodiment of the foregoing turbine engine exhaust liner tile, the cap comprises a ceramic cap surface, and the ceramic cap surface is flush with the ceramic tile.

In a further embodiment of the foregoing turbine engine exhaust liner tile, the cap comprises a ceramic cap surface, and the ceramic cap surface is flush with the ceramic tile.

In a further embodiment of the foregoing turbine engine exhaust liner tile, the ball lock mechanism comprises a ball lock section of the shaft and a locking feature, the ball-lock section has a larger diameter than a remainder of the shaft, and the locking feature is adjacent the ball-lock section of the shaft when the shaft is in a locked position.

In a further embodiment of the foregoing turbine engine exhaust liner tile, the push-down pop-up mechanism comprises a cam follower having a cam with a lower equilibrium point and a higher equilibrium point, the spring is maintained in a compressed state when the cam is at the higher equilibrium point, and the spring is maintained in a partially relaxed state when the cam is at the lower equilibrium point.

In a further embodiment of the foregoing turbine engine exhaust liner tile, the cap protrudes from a ceramic tile surface face when the pin is in an unlocked position, thereby operating as a handle.

These and other features of the present invention can be best understood from the following specification and drawings, the following of which is a brief description.

BRIEF DESCRIPTION OF THE DRAWINGS

FIG. 5B schematically illustrates the third example push-lock pin connector in a locked position.

DETAILED DESCRIPTION

Figure 1:
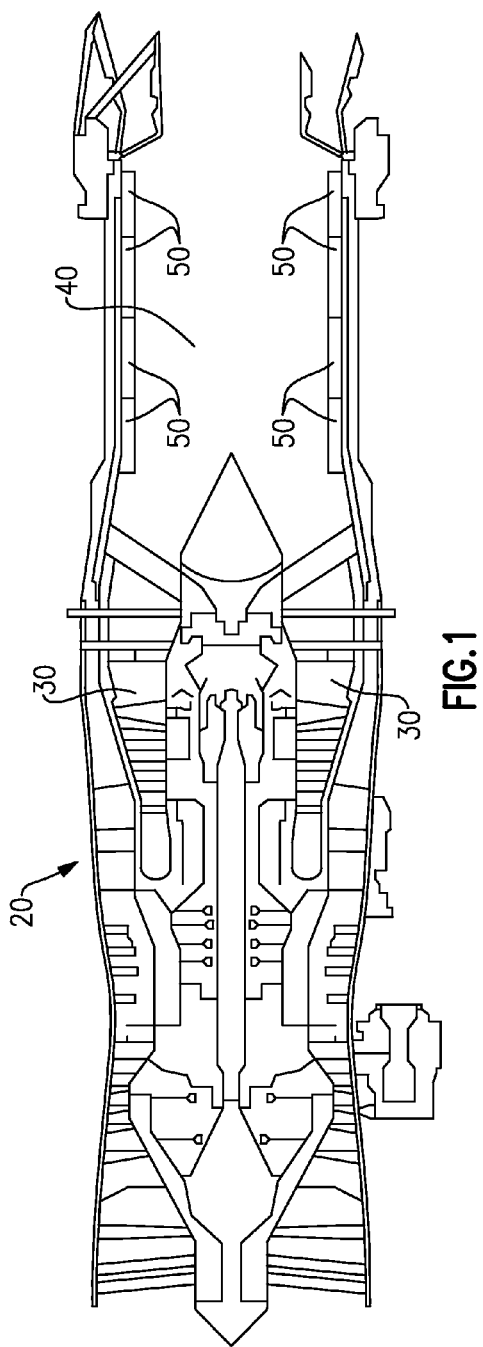
FIG. 1 schematically illustrates an example gas turbine engine.

FIG. 1 schematically illustrates an example gas turbine engine 20, including a gas path 30. The gas path 30 outputs heated gas into an exhaust path 40. In order to prevent heat damage to the exhaust path 40 walls, and to the components adjacent the exhaust path 40, the exhaust path 40 is lined with ceramic insulation panels 50. The ceramic insulation panels 50 are each connected to the walls of the exhaust path 40 via a number of push-lock connector pins. Existing exhaust liners utilize a single metal sheet with multiple air holes. Cooling air is pumped through the air holes to cool the exhaust path 40 according to known active cooling techniques. The existing exhaust path 40 liners are permanently affixed to the turbine engine exhaust path 40 walls. As a result, in order to perform maintenance on the exhaust path liner the turbine engine 20 must be removed from the aircraft.

In contrast, the presently disclosed ceramic insulation panels 50 have a significantly higher heat capacity than a metal liner and thus do not need to be actively cooled to prevent heat from passing through the exhaust path 40 walls. The ceramic insulation panels 50 are each individually connected to the exhaust path walls 40 as described below with regards to FIG. 2, and combine to form a tiled exhaust path liner that protects engine components adjacent to the exhaust path from excess heat.

Figure 2:
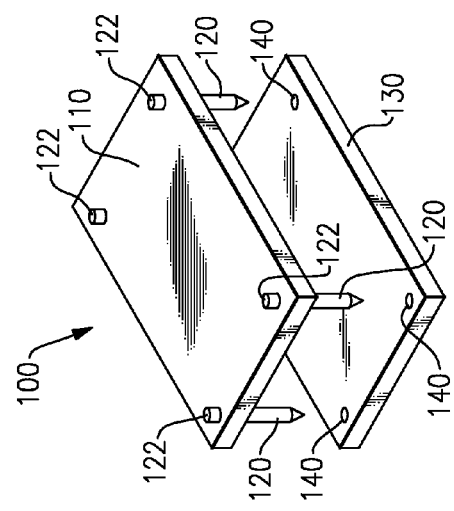
FIG. 2 schematically illustrates an insulation panel that can be used in a gas turbine engine.

FIG. 2 schematically illustrates an example ceramic insulation panel 100 that can be used in the exhaust path 40 of FIG. 1. The ceramic insulation panel 100 includes a ceramic tile 110 with multiple push-lock connectors 120 protruding from the ceramic tile 110. The push-lock connectors 120 engage with a metal substrate 130 (such as the exhaust path 40 walls) via a corresponding connection feature 140 in the metal substrate 130.

To connect the ceramic tile 110 to the metal substrate 130, the push-lock connectors 120 are inserted into the connection features 140. Once inserted, a cap 122 on the push-lock connector 120 is pushed, placing the push-lock connector in a locked position. To unlock the push-lock connector 120, the cap 122 is pushed again, placing the push-lock connector 120 in an unlocked position. When the push-lock connectors 120 are in the locked position, the ceramic tile 110 cannot be removed from the metal substrate 130. In the locked position, the cap 122 is flush with the surface of panel 110. When the push-lock connectors 120 are in the unlocked position, the ceramic tile 110 can be removed and replaced. In the unlocked position, cap 122 is protruding from the surface of panel 110. This creates a handle to facilitate the removal of panel 110. The cap 122 further includes a top ceramic surface matching the ceramic tile 110 such that the flush cap 122, when the push-lock connector 120 is in the locked position, has a ceramic surface flush with the ceramic tile 110.

Figure 3A:
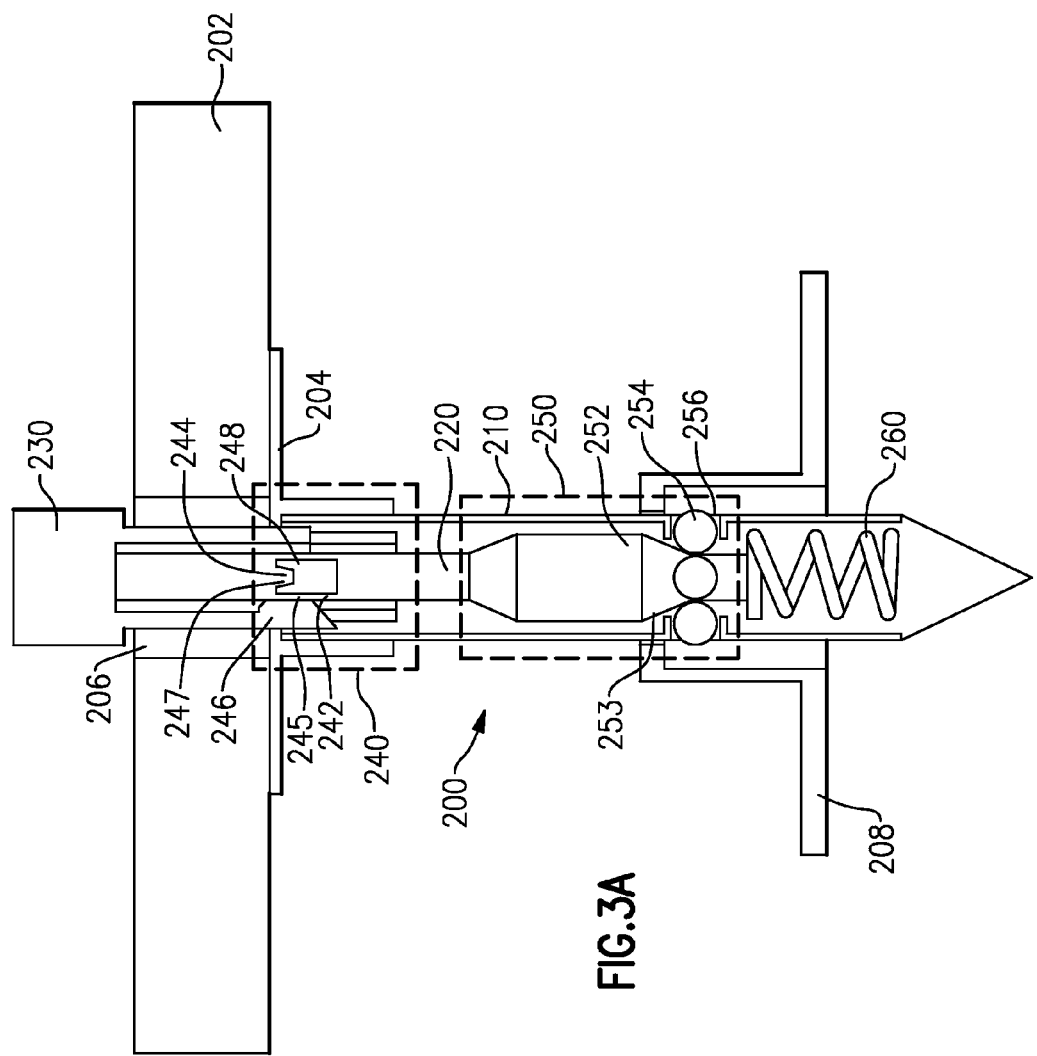
FIG. 3A schematically illustrates a first example push-lock pin connector in an unlocked position.
Figure 3B:
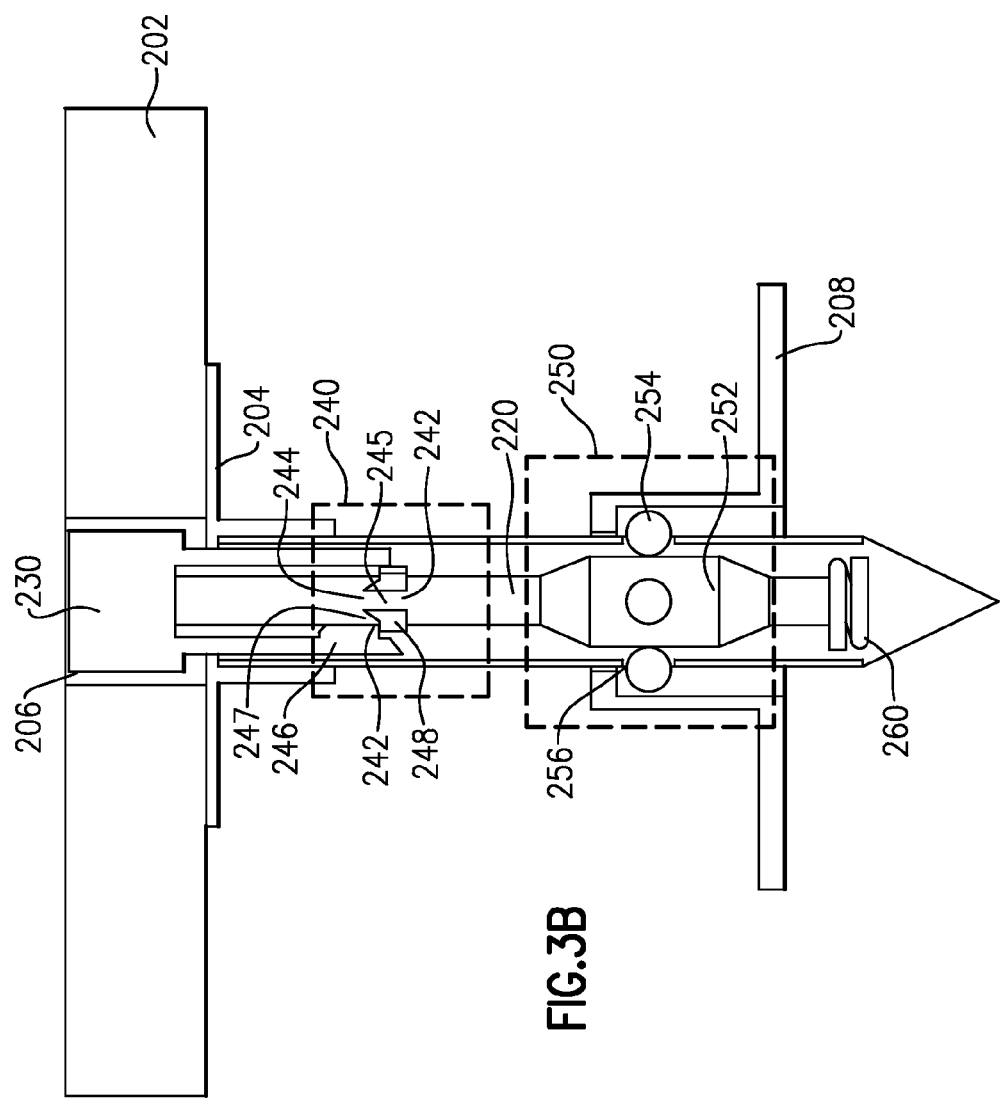
FIG. 3B schematically illustrates the first example push-lock pin connector in a locked position.

FIGS. 3A and 3B illustrate a first example push-lock pin 200 that can be utilized in the example ceramic insulation panel arrangement of FIG. 2, with FIG. 3A illustrating the push-lock pin 200 in an unlocked position and FIG. 3B illustrating the push-lock pin 200 in a locked position. The push-lock pin 200 protrudes through an opening 206 in a ceramic panel 202, and is affixed to the ceramic panel 202 via a fastener 204. The fastener 204 is also affixed to a cylindrical pin housing 210. The fastener can be any bracket type fastener and can be affixed to the pin housing 210 and the ceramic panel 202 using any known method.

Within the cylindrical pin housing 210 is a shaft 220. The shaft 220 includes a ball-lock mechanism 250 and a push-down pop-up mechanism 240. A cap 230 is attached to a first axial end of the shaft 220. A spring 260 is positioned on a second axial end of the shaft 220 opposite the first axial end. In some example arrangements, such as the arrangement of FIGS. 3A and 3B the shaft 220 includes features causing the shaft 220 to rotate within the pin housing 210 whenever the cap 230 is depressed.

Referring now to the ball-lock mechanism 250, the shaft 220 includes a wide section 252 and an angled section 253. Multiple locking features 254, such as spherical ball bearings, surround the shaft 220. When the shaft 220 shifts axially toward the ball-lock mechanism 250, the locking features 254 shift across the angled section 253 to the wide section 252. Adjacent to the locking features 254 are multiple openings 256 in the pin housing 210. When the push-lock pin 200 is in a locked position, FIG. 3B, the locking features 254 are pushed partially radially out of the pin housing 210 openings 256, and prevent the push-lock pin 200 from being removed from the metal substrate 208. When the push-lock pin 200 is in an unlocked position, the locking features 254 are contained within the pin housing 210 and the push-lock pin 200 can be removed from the metal substrate 208. Although described and illustrated herein as spherical ball bearings, any alternate shape locking feature 254, such as a cylindrical locking feature 254, can be used to the same affect.

Referring now to the push-down pop-up mechanism 240 of the push-lock pin 200, the push-down pop-up mechanism 240 is a mechanical feature of the shaft 220. The mechanical feature is made up of multiple outcroppings 248 defining a groove 245 between each outcropping 248, and a partial groove 247 within each outcropping 248. When the cap feature 246 is located in the groove 245 between the outcroppings 248, the cap feature 246 is in a low equilibrium point 242. When the cap feature 246 is in the partial groove 247, the cap feature 246 is in the high equilibrium point 244. Activation of the cap 230 moves the axial position of the shaft 220 between the two equilibrium points 242, 244, a low equilibrium point 242 and a high equilibrium point 244, and rotates the shaft 220. The spring 260 exerts an axial force on the shaft 220.

Activating the push-down pop-up mechanism (depressing the cap 230) causes a cap feature 246 to shift from a current equilibrium point 242, 244 to the other equilibrium point 242, 244. When the shaft 210 is resting in the high equilibrium point 244 (FIG. 3B) the ball-lock mechanism 250 is maintained in the locked position via a combination of the cap feature 246 and the axial force provided by the spring 260. Similarly, the cap 230 is maintained approximately flush with the ceramic panel 202. Conversely, when the shaft 210 is resting in the low equilibrium point 242, the ball-lock mechanism 250 is unlocked, and the cap 230 is not flush with the ceramic panel 202.

Figure 4A:
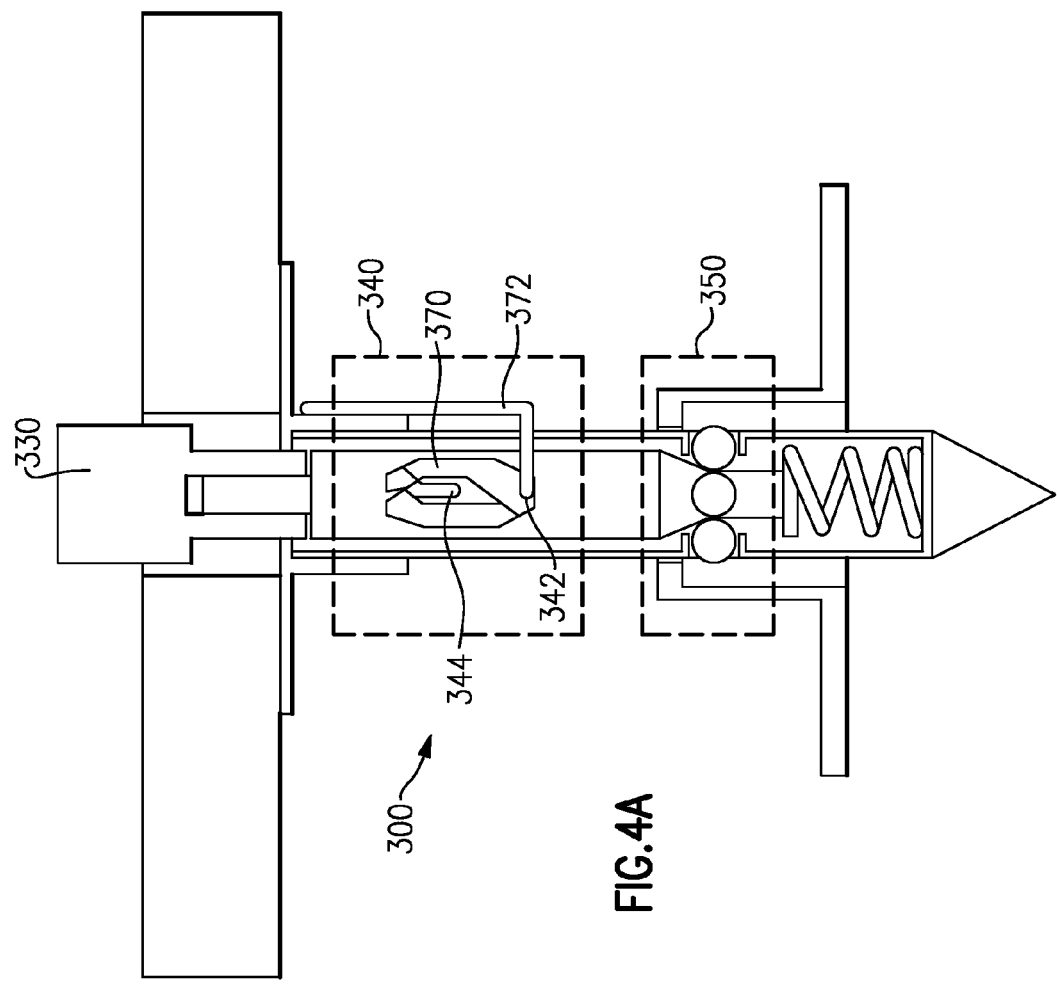
FIG. 4A schematically illustrates a second example push-lock pin connector in an unlocked position.
Figure 4C:
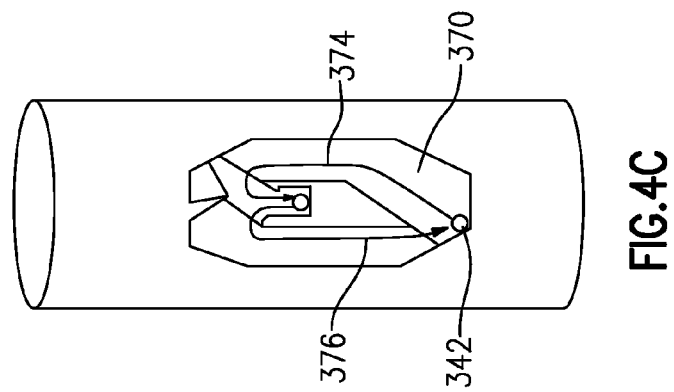
FIG. 4C illustrates the cam structure of FIGS. 4A and 4B in greater detail.
Figure 4B:
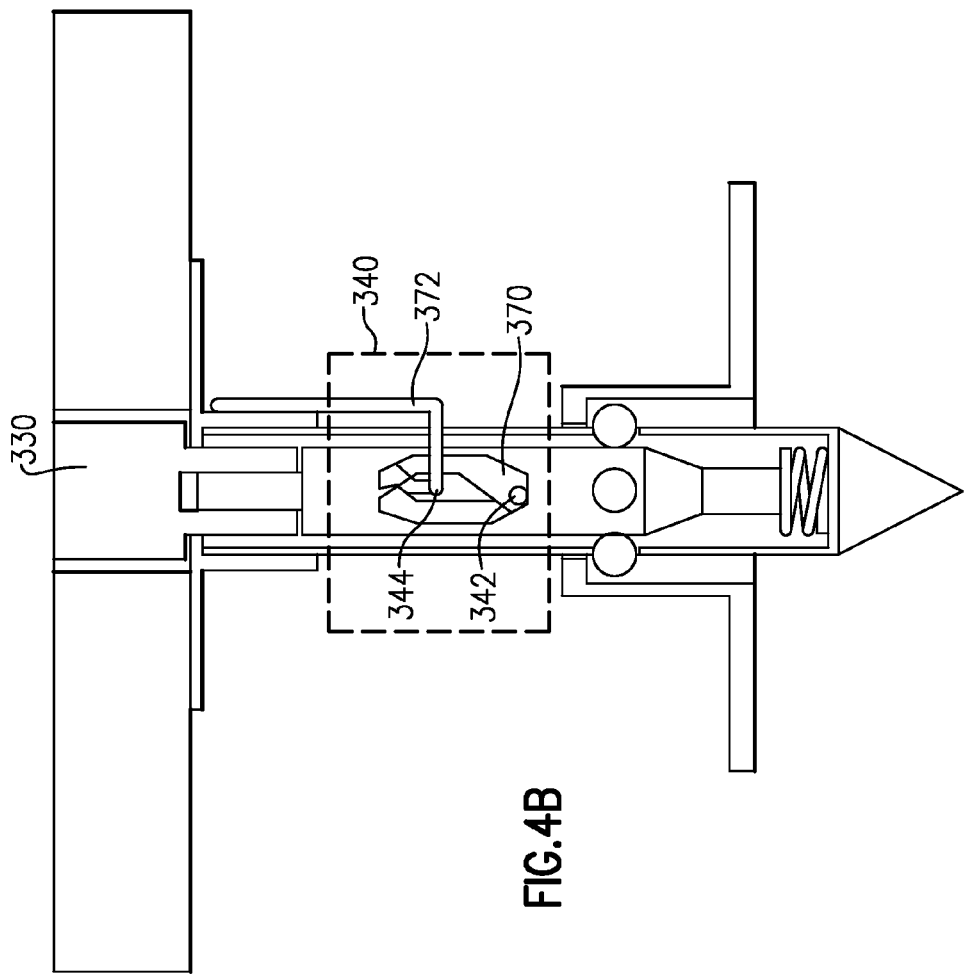
FIG. 4B schematically illustrates the second example push-lock pin connector in a locked position.

FIGS. 4A, 4B and 4C illustrate a similar push-lock pin 300 including a different push-down pop-up mechanism 340, with FIG. 4A illustrating the push-lock pin 300 in an unlocked position, FIG. 4B illustrating the push-lock pin 300 in a locked position, and FIG. 4C illustrating a push-down pop-up mechanism 340 in greater detail. The ball-lock mechanism 350 functions the same as the ball-lock mechanism 250 in FIGS. 3A and 3B. The push-down pop-up mechanism 340 of FIGS. 4A, 4B and 4C utilizes a shaped cam component 370 and a separate pin component 372. The separate pin component 372 replaces the cap feature 246 of FIGS. 3A and 3B, and serves a similar function.

The push-down pop-up mechanism 340 includes a cam structure 370 with a high equilibrium point 344 and a low equilibrium point 342. The separate pin 372 extends into the cam 370 and rests in one of the equilibrium points 342, 344. Activation of the push-lock pin 300 causes the separate pin component 372 to shift from a current equilibrium point to the other equilibrium point 342, 344.

FIG. 4C diagrams the movement of the separate pin component 372 from the low equilibrium point 342 to the high equilibrium point 344 along a movement path or track 374. Similarly, FIG. 4C diagrams the movement from the high equilibrium point 344 to the low equilibrium point 342 along a movement path or track 376. The contours of the cam mechanism 370 ensure that the separate pin component 372 follows the illustrated movement paths or tracks 374, 376 and properly transitions between the high equilibrium point 344 and the low equilibrium point 342 when the cap 330 is depressed.

Figure 5A:
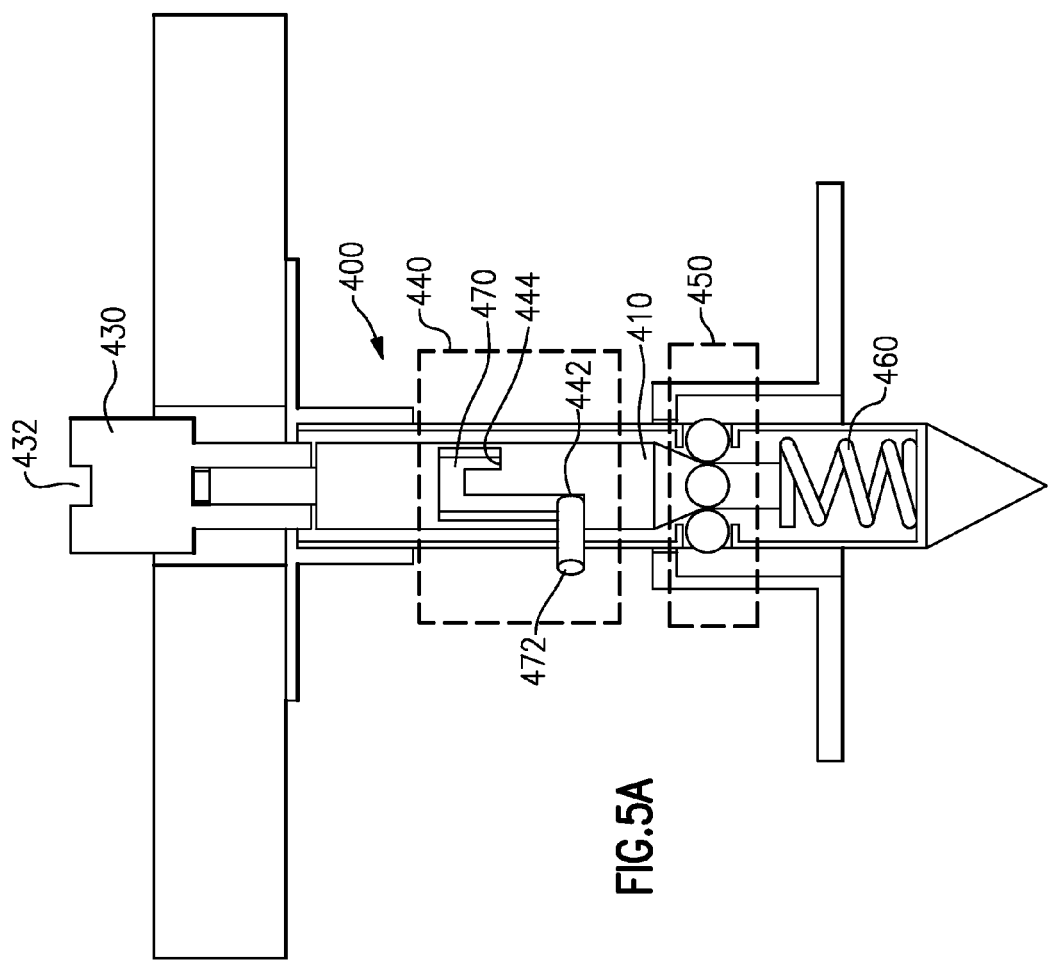
FIG. 5A schematically illustrates a third example push-lock pin connector in an unlocked position.

FIGS. 5A and 5B illustrate a third example push-down pop-up mechanism 440, with FIG. 5A illustrating the push-lock pin 400 in an unlocked position and FIG. 5B illustrating the push-lock pin 400 in a locked position. The ball-lock mechanism 450 functions the same as the ball-lock mechanism 250 in FIGS. 3A and 3B. As with the previously described push-down pop-up mechanisms (240, 340), the example of FIGS. 5A and 5B includes two equilibrium points 442, 444, a high equilibrium point 444 and a low equilibrium point 442. The example of 5A also includes a groove 432 in the cap 430 to allow a technician to rotate the pin 400 using a tool.

The example push-down pop-up mechanism of FIGS. 5A and 5B is a turn lock mechanism. To place the pin 400 in the locked position (with a separate pin 472 in the high equilibrium point 444), the cap 430 is depressed and a tool, such as a screwdriver, is interfaced with the groove 432 and rotated. The rotation of the cap 430 causes the rotation of the shaft 410 and shifts the pin to a portion of the groove 470 corresponding to the high equilibrium point 444. Releasing the cap 430 causes the force from the spring 460 to push the shaft 410 such that the pin 472 is in the new equilibrium position 442, 444. To place the pin 400 in the unlocked position, the cap is depressed and the tool is interfaced with the groove 432 as described previously, and the pin 400 is rotated in the opposite direction.

While the above disclosure is directed toward insulation tiling for an aircraft engine, it is understood that the described connector pin can be utilized in any application where it is desirable to connect a panel to a surface without providing access to a reverse side of the surface.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A push-lock pin for connecting a plate to a surface comprising:
   a cylindrical pin housing;
   a shaft within said cylindrical pin housing wherein said shaft comprises a ball-lock mechanism, and a push-down pop-up mechanism;
   a cap, connected to a first axial end of said shaft;
   a spring connected to a second axial end of said shaft, wherein said second axial end is opposite said first axial end;
   wherein said push-down pop-up mechanism comprises a separate pin component, the separate pin component including at least a portion normal to an axis defined by the shaft and a cam having a first equilibrium point and a second equilibrium point, wherein said spring is maintained in a compressed state when said cam is at the second equilibrium point, and said spring is maintained in a partially relaxed state when said cam is at the first equilibrium point;
   the separate pin component extends radially into said cam; and
   the cam defining a first movement track of the separate pin component from the first equilibrium point to the second equilibrium point, and a second movement track of the separate pin component from the second equilibrium point to the first equilibrium point, wherein the first movement track is distinct from the second movement track.

2. The push-lock pin of claim 1, wherein said ball-lock mechanism comprises a ball-lock section of said shaft and a locking feature, wherein said ball-lock mechanism has a larger diameter than a remainder of said shaft, and said locking feature is adjacent said ball-lock section of said shaft when said shaft is in a locked position.

3. The push-lock pin of claim 2, wherein said locking feature protrudes from at least one opening in said cylindrical pin housing when said push-lock pin is in a locked position.

4. The push-lock pin of claim 2, wherein said spring is at least partially compressed when said push-lock pin is in the locked position.

5. The push-lock pin of claim 2, wherein said locking feature is a plurality of approximately spherical bearings.

6. The push-lock pin of claim 1, wherein said ball-lock mechanism is in a locked position when said separate pin component is in the second equilibrium point, and said ball-lock mechanism is in an unlocked position when said separate pin component is in the first equilibrium point.

7. The push-lock pin of claim 1, wherein said push-down pop-up mechanism comprises a combination of at least one shaft feature and at least one cap feature, where said shaft feature includes a second equilibrium point and said shaft feature includes a first equilibrium point.

8. A turbine engine exhaust liner tile comprising:
   a ceramic tile surface;
   a push-lock pin hole in said ceramic tile surface;
   a connector connecting at least one push-lock pin to said ceramic tile surface and retaining said push-lock pin in said push-lock pin hole;
   the at least one push-lock pin for connecting said ceramic tile surface to a turbine engine exhaust path wall;
   wherein said at least one push-lock pin comprises a cylindrical pin housing;

a shaft within said cylindrical pin housing wherein said shaft comprises a ball-lock mechanism, and a push-down pop-up mechanism, a cap connected to a first axial end of said shaft, and a spring connected to a second axial end of said shaft, wherein said second axial end is axially opposite said first axial end; and said push-down pop-up mechanism comprising a separate pin component, the separate pin component including at least a portion normal to an axis defined by the shaft and a cam with a first equilibrium point and a second equilibrium point, wherein said spring is maintained in a compressed state when said cam is at the second equilibrium point, and said spring is maintained in a partially relaxed state when said cam is at the first equilibrium point; and the separate pin component extends radially into said cam; and the cam defining a first movement track of the separate pin component from the first equilibrium point to the second equilibrium point, and a second movement track of the separate pin component from the second equilibrium point to the first equilibrium point, wherein the first movement track is distinct from the second movement track.

9. The turbine engine exhaust liner tile of claim 8, wherein said cap is flush with a surface of said ceramic tile surface when said at least one push-lock pin is in a locked position.

10. The turbine engine exhaust liner tile of claim 8, wherein said ceramic tile surface is a heat panel.

11. The turbine engine exhaust liner tile of claim 8, wherein said cap comprises a ceramic cap surface, and wherein said ceramic cap surface is flush with said ceramic tile surface.

12. The turbine engine exhaust liner tile of claim 8, wherein said ball-lock mechanism comprises a ball-lock section of said shaft and a locking feature, wherein said ball-lock section has a larger diameter than a remainder of said shaft, and said locking feature is adjacent said ball-lock section of said shaft when said shaft is in a locked position.

13. The turbine engine exhaust liner tile of claim 8, wherein said cap protrudes from a ceramic tile surface face when said at least one push-lock pin is in an unlocked position, thereby operating as a handle.

14. The push-lock pin of claim 1, wherein the cam is defined by a slot protruding radially into the shaft.

* * * * *